United States Patent

[11] 3,613,613

[72] Inventors Edward F. Loritz
Chicago;
Harold W. Unger, Mount Prospect, both of Ill.
[21] Appl. No. 830,200
[22] Filed July 29, 1959
[45] Patented Oct. 19, 1971
[73] Assignee Continental Can Company, Inc.
New York, N.Y.

[54] CLOSURE MEMBER COATING COMPOSITION COMPRISING AN ORGANOSOL-SOLUTION OF POLYVINYL CHLORIDE, ACRYLONITRILE-BUTADIENE COPOLYMER, AND PHENOLIC RESOLE RESIN
17 Claims, No Drawings

[52] U.S. Cl. ..................................................... 113/80 DA, 113/121 A, 117/162, 215/80, 260/31.4, 260/32.8, 260/33.6
[51] Int. Cl. ........................................................... B21d 51/46
[50] Field of Search.............................................. 260/34.2, 43 U, 43 BU, 32.4, 43 L, 43 K, 43 R, 31.2 R, 31.2 T, 32.8 A, 31.8 R, 31.4, 31.2, 33.6, 38, 43; 113/121; 117/133, 162, 132

[56] References Cited
UNITED STATES PATENTS

| | | | |
|---|---|---|---|
| 2,324,078 | 7/1943 | Gray et al. | 260/43 |
| 2,528,506 | 11/1950 | Foye | 18/59 |
| 2,647,101 | 7/1953 | Humphrey et al. | 260/32.4 |
| 2,684,350 | 7/1954 | Williams | 260/43 |
| 2,872,366 | 2/1959 | Kiernan et al. | 260/31.8 |
| 2,931,782 | 4/1960 | Jarrett | 260/43 |
| 2,935,763 | 5/1960 | Newman et al. | 260/43 |
| 2,951,769 | 9/1960 | McKnight | 260/43 |

OTHER REFERENCES

Nielson: Organosol Formulation, Modern Plastic Vol. 27, No. 9 pp. 97, 98, 100, 102 May 1950

*Primary Examiner*—Charles W. Lanham
*Assistant Examiner*—Michael J. Keenan
*Attorney*—Cromwell, Greist & Warden

CLAIM: 1. A three-component resin coating composition for coating closure members, comprising polyvinyl chloride resin, solvated acrylonitrile-butadiene copolymer, a solvated phenolic resole resin, and solvents for said acrylonitrile-butadiene copolymer and phenolic resole resin, said polyvinyl chloride resin being dispersed with the solvated components to form a combination organosol-solution.

CLOSURE MEMBER COATING COMPOSITION COMPRISING AN ORGANOSOL-SOLUTION OF POLYVINYL CHLORIDE, ACRYLONITRILE-BUTADIENE COPOLYMER, AND PHENOLIC RESOLE RESIN

The present invention relates to a new and improved enamel-type coating composition particularly adapted for application to the inner surface of a closure member, such as a rotatable or press-on cap, used on a glass container. More specifically, the present invention is directed to a three-component resin base enamel particularly adapted for use as a closure member coating to which a plastisol-type gasket readily adheres particularly at high-temperature-pressure conditions.

Plastisol-type gasketing materials are basically vinyl chloride resin-containing suspensions in nonaqueous liquids which do not dissolve the resin at ordinary temperature. If the liquid phase consists only of plasticizers, the dispersion or suspension is termed a "plastisol." If the dispersing liquid contains volatile components, the dispersion is termed an "organosol." Plastisols may be converted to organosols by thinning with volatile liquids. Both plastisols and organosols can be converted to tough films by heating to approximately 340° F. to 375° F. depending upon what type of plasticizer is used. The vinyl chloride resins used are of high molecular weight such as on the order of 80,000.

An uncured or partially cured concentric ring of the plastisol material is placed in sealing position within a closure member by a suitable method. One such method involves the plastisol in paste form being flowed in following which the formed gasket is heated and cured in place within the closure member. The resulting fluxed gasketing material will perform in the same manner as rubber gasketing material providing adequate adherence or bonding of the plastisol to the cap coating is obtained during fluxing or curing of the plastisol in the cap. This adherence must be maintained during heat processing of the contents of a container to which the cap is applied as well as under pressure differential conditions which may occur during pressure application of the cap to the container or where the contents are sealed under superatmospheric conditions as with carbonated beverages.

As a result of experience with plastisol-type gasketing materials, it has been found that a problem does exist in connection with the maintaining of adequate adherence between the cured plastisol and known types of metal-cap-coating compositions. The cap-coating compositions are inert enamels or lacquers which are baked on the surfaces of caps and particularly the inner surfaces thereof to protect against food contamination or off-coloring as a result of chemical reaction with the metal of the cap. Where packaged food products require heat treatment after the capping (hermetic sealing) operation is completed, there is a great need for improved adhesion between the plastisol and the cap coating. This problem is more acute at temperatures above 212° F. (exceeding this temperature is generally necessary for product sterilization) at which temperatures the plastisol-type gasketing material may be subjected to both internal and external pressures of a degree that the adhesive bond existing between the plastisol and the cap coating may not be sufficient to prevent separation of the plastisol gasket from the coating. Any substantial movement of the plastisol gasket relative to the cap to which it is secured may result in separation of the gasket from the coating and destruction of the hermetic seal. Even slight movement may result in the formation of crevices which are possible corrosion sites. These are usually associated with areas where enamel quality has been impaired during the fluxing or adhering of the plastisol paste or gasket into place. Heat processing greatly increases the chances of the above happening.

Efforts have been directed to the development of specific closure member designs incorporating therein mechanical features to prevent shifting or movement of the plastisol gasket. Still further, the actual shape of the plastisol gasket itself has been taken into consideration and considerable success has been realized from the provision of special edging configurations forming a part of the gasket with these edges being located in the cap so as to be unaffected by the tensions and torques of sealing pressures and thus being capable of maintaining adequate sealing adherence with the cap coating. While these efforts have been directed to improving upon the physical shape of the cap and/or gasket, it has been recognized that adherence failure might be overcome by substantially improving the adherence between the gasket and the cap coating. At lower conditions of processing temperatures (below 212° F.) and cap application pressure differentials, adequate adherence is retained to prevent gasket separation. However, under more extreme conditions separation will occur. It has been considered that the coating compositions in the form of enamels or lacquers commonly used in closure members are incapable of resisting plasticizer migration from the plastisol gasket material even during the less extreme heat-curing or fluxing process. With migration of the plasticizers of the plastisol composition, the adhesion film set up between the plastisol and the coating is weakened at least to an extent that subsequent high temperature and pressure food processing overcomes the residual adherence and results in gasket movement or shifting.

With this in mind, various known coating compositions have been tested and each has been found to be incapable of establishing and maintaining adequate adherence with a plastisol gasket material under high temperature and/or pressure differential conditions reached during the capping and/or processing of the contents of a container. By way of example, some of the better performing coating compositions including phenolic modified vinyl chloride—vinyl acetate copolymers have been tested with a suitable plastisol gasket material and it has been found that there is as much as 10 percent failure at 212° F. under retort pressure conditions. Hermetic seal failure to this extent is quite costly on a commercial basis and it will be appreciated that the percent failure substantially increases where retort temperatures exceed 212° F. which is often necessary in connection with the processing of meat products.

It is an object of the present invention to provide a new and improved coating composition exhibiting improved plastisol adhesion and to which a plastisol-type gasket readily adheres and maintains its adherence under elevated temperature-pressure processing conditions.

A further object is to provide a new and improved resin base enamel particularly adapted for use as a closure member coating to which a plastisol-type gasket readily adheres, the enamel being in the form of a combination organosol-solution coating readily adherent to metallic surfaces.

Another object is to provide a three-component resin base enamel particularly adapted for use as a closure member coating which readily adheres to a metallic surface, the enamel being in the form of a combination organosol-solution coating.

Still a further object is to provide a new and improved three-component resin base enamel particularly adapted for use as a closure member coating to which a plastisol-type gasket readily adheres, the enamel including polyvinyl chloride resin, acrylonitrile-butadiene copolymer, and a phenolic resin having solubility characteristics of a resole dispersed and solvated to define a combination organosol-solution coating.

Another object is to provide a new and improved closure member such as a rotatable cap including a top panel and depending skirt portion, the inner surface of the top panel having applied thereto the new and improved resin base coating forming a part of the present invention, the top panel further carrying a plastisol-type sealing gasket secured to the coating.

A further important object of the present invention is the provision of a new and improved method of formulating a resin base coating composition of the type described in the foregoing objects, the composition being particularly adapted for use as a lining in a closure member and to which is readily and permanently adhered a plastisol-type gasket.

Other objects not specifically set forth will become apparent from the following detailed description of the present invention.

The coating composition of the present invention is basically a modified polyvinyl chloride organosol which with proper use of dispersants, solvents and diluents may be readily formulated for application to the sheet metal from which the cap shells are die-punched, by roller-coating procedures, spraying, dipping or brushing. The basic resin in the coating composition is high molecular weight polyvinyl chloride dispersed to form an organosol which is, in turn, modified by the presence of acrylonitrile-butadiene synthetic rubber polymer and phenolic baking-type resole resin. The modifying resins or polymers are solvated in the presence of the polyvinyl chloride organosol, the coating composition is, in effect, a three-component resin base organosol-solution mixture having the characteristics of an enamel. By referring to the term "resin base," it is intended to define the solid resinous ingredients of the coating composition to the exclusion of any pigments that might be present.

Organosols as distinguished from plastisols are generally resin dispersions or suspensions in nonaqueous liquids which, as in the case of plastisols, do not dissolve the resin at ordinary temperatures but which do contain volatile components as distinguished from plastisols. To further illustrate this distinction, plastisols may be converted to organosols by thinning with volatile liquids. Both plastisols and organosols can be converted to tough films by heating to approximately 340° F. to 375° F. depending upon the type of plasticizer used. In the instance of plastisols the fluxing or curing is instantaneous at the temperatures specified. The three-component resin base coating composition of the present invention has been described as an organosol-solution mixture having the characteristics of an enamel. In comparing this definition with the accepted definition of a straight organosol, the coating composition is then a mixture of resins some of which behave like a dispersion and others which go into solution at room temperatures.

In the use of long-chain polyvinyl chloride as practically the sole resin in forming organosol coatings, it has been found that the coatings following application and baking are too brittle and lack adequate adhesion to tinplate especially during the forming of the coated tinplate into closure members. With the addition of acrylonitrile-butadiene copolymer to the long-chain polyvinyl chloride, the coatings are too tacky and soft. The articles carrying such two-component resin base coatings as a liner must be handled with care to prevent scratching and, with the coating also being tacky, a stacking problem is present. In effect, the acrylonitrile-butadiene copolymer functions to plasticize the polyvinyl chloride and give adhesion to the base tinplate or base coatings, but in doing so tends to make the coating tacky and subject to scratching.

Polyvinyl chloride-phenolic mixtures have not been considered desirable as coatings in view of the fact that the combined resins generally exhibit extreme incompatability with one another. In accordance with the principles of the present invention, it has been found that in the presence of acrylonitrile-butadiene copolymer, a polyvinyl chloride-phenolic mixture is made compatible to an extent entirely adequate for tinplate coating. In addition, this specific combination of resinous materials eliminates coating tackiness and softness to a desired extent. It has also been found that the three-component resinous mixture is very adequately flexible and exhibits improved adherence to a metal surface.

The three-component resin-coating composition described not only exhibits the necessary adhesion for proper application to a metal surface, but also has been found to exhibit the necessary bonding characteristics which enable a plastisol-type gasketing material to adhere to the same even during high-temperature processing of the contents of a closed container and under appreciable pressure differential conditions. The coating composition is very readily applied to the inner surface of a metallic closure member either directly to the cap blank metallic strip by roller-coating prior to closure cap stamping, or subsequent to cap formation by spraying, dipping, brushing or any other suitable commercial application procedure. As previously described, variation of the dispersants, solvents and diluents used in formulating the composition will control the manner in which the same is to be applied to the metal surface. Following application and baking, the coating is in the form of a film exhibiting great uniformity and strong adherence to the metal surface. The film is readily subject to lithography and other production operations if such should be desired. The coating composition may also be suitably used as a second or third coating applied over conventional lacquers or enamels and still maintain and exhibit the superior adhesion required during the extreme food-processing conditions. In certain instances an undercoating for corrosive resistance purposes may be desirable. Any suitable undercoating composition may be used such as a known coating of copolymeric vinyl acetate and vinyl chloride modified by phenolic resin. This type of coating alone is inadequate due to poor plastisol adherence under the cap application and for high-temperature-processing conditions involved.

In connection with the superior adhesion established between the coating composition of the present invention and a plastisol-type gasketing material, it has been found that retort temperatures as high as 250° F. can be used without hermetic seal failure or the development of any appreciable percentage of "leakers." Retort pressure differentials (external pressure applied to the cap as compared with internal container pressure) may be as great as about 30 lbs./sq. in. under the higher temperature conditions without destroying the greatly improved adherence between the plastisol-type gasket and the coating composition of the present invention. The conditions specified are merely examples of extreme conditions which the combined plastisol-type gasket and coating composition of the present invention are capable of withstanding, it being understood that the adherence established between these materials is so improved that widely varying temperature and pressure differential conditions are insufficient to destroy the same to an extent that sealing effectiveness is reduced.

It is believed that following application of the plastisol to the coating and during heat curing of the plastisol at temperatures approximating 375° F. which occurs virtually instantaneously without detriment to the adhesion developed, a certain amount of plasticizer migrates from the plastisol into the coating and partially solvates a small portion of the baked-out film. With this compatibility occurring, the polyvinyl chloride of the plastisol at least in theory intermingles with (possibly in the manner of a solution) or might even graft onto the long-chain polyvinyl chloride of the coating resulting in firm attachment of the plastisol to the coating. Long-chain polyvinyl chloride functions basically to prevent excessive plastisol plasticizer migration from the plastisol into the coating but the inherent hardness of the polyvinyl chloride is modified as a result of its combination with acrylonitrile-butadiene copolymer and phenolic resin to an extent to permit adequate plastisol plasticizer migration without canceling out the important function of preventing excessive plastisol plasticizer migration. While this phenomenon is considered to be a theoretical explanation of the results obtained, it nevertheless remains that strong adherence even under high-temperature and/or pressure differential conditions is established between a plastisol-type gasketing material and the coating composition of the present invention. The basic film properties and characteristics are not destroyed as a result of the limited or controlled plastisol plasticizer migration and the coating remains firmly adhered to the metal surface. On the basis that the coating includes ingredients which are partially solvated, it is believed that this unique characteristic enables the formation of a strong bond between the plastisol and the coating. This characteristic eliminates in many instances the necessity of resorting to special closure cap structural features or designs for the purpose of preventing movement or shifting of the plastisol gasket while being further an adequate substitute for the necessity of exact controlled placement of the plastisol in the closure cap or special shaping of the plastisol. The following examples are illustrative of various coating compositions of the present invention:

EXAMPLE 1

| Solid Ingredients | Percent By Weight |
|---|---|
| Polyvinyl chloride resin | 73 |
| Phenolic resin | 10 |
| Acrylonitrile-butadiene synthetic rubber | 15 |
| Pure titanium dioxide | 2 |
| | 100 |

| Nonsolid Ingredients | |
|---|---|
| Ketone | 27 |
| Aromatic | 73 |
| | 100 |

| Organosol-Solution Coating Composition | |
|---|---|
| Resin base plus pigment | 18.5 |
| Ketone | 18.5 |
| Aromatic | 63.0 |
| | 100.0 |

EXAMPLE 2

| Solid Ingredients | Percent By Weight |
|---|---|
| Polyvinyl chloride resin | 73 |
| Acrylonitrile-butadiene synthetic rubber | 10 |
| Phenolic resin | 15 |
| Pure titanium dioxide | 2 |
| | 100 |

| Nonsolid Ingredients | |
|---|---|
| Ketone | 22 |
| Aromatic | 78 |
| | 100 |

| Organosol-Solution Coating Composition | |
|---|---|
| Resin base plus pigment | 19 |
| Ketone | 18 |
| Aromatic | 63 |
| | 100 |

EXAMPLE 3

| Solid Ingredients | Percent By Weight |
|---|---|
| Polyvinyl chloride resin | 65 |
| Acrylonitrile-butadiene synthetic rubber | 20 |
| Phenolic resin | 13 |
| Pure titanium dioxide | 2 |
| | 100 |

| Nonsolid Ingredients | |
|---|---|
| Ketone | 26 |
| Aromatic | 74 |
| | 100 |

| Organosol-Solution Coating Composition | |
|---|---|
| Resin base plus pigment | 18.40 |
| Ketone | 21.30 |
| Aromatic | 60.30 |
| | 100.00 |

EXAMPLE 4

| Solid Ingredients | Percent By Weight |
|---|---|
| Polyvinyl chloride resin | 58 |
| Acrylonitrile-butadiene synthetic rubber | 17 |
| Phenolic resin | 23 |
| Pure titanium dioxide | 2 |
| | 100 |

Example 4—Continued

| Nonsolid Ingredients | |
|---|---|
| Ketone | 27 |
| Aromatic | 73 |
| | 100 |

| Organosol-Solution Coating Composition | |
|---|---|
| Resin base plus pigment | 19.6 |
| Ketone | 22.0 |
| Aromatic | 58.4 |
| | 100.0 |

EXAMPLE 5

| Solid Ingredients | Percent By Weight |
|---|---|
| Polyvinyl chloride resin | 58.0 |
| Acrylonitrile-butadiene synthetic rubber | 16.5 |
| Phenolic resin | 23.5 |
| Pure titanium dioxide | 2.0 |
| | 100.0 |

| Nonsolid Ingredients | |
|---|---|
| Ketone | 33 |
| Aromatic | 67 |
| | 100 |

| Organosol-Solution Coating Composition | |
|---|---|
| Resin base plus pigment | 28 |
| Ketone | 24 |
| Aromatic | 48 |
| | 100 |

EXAMPLE 6

| Solid Ingredients | Percent By Weight |
|---|---|
| Polyvinyl chloride resin | 53 |
| Acrylonitrile-butadiene synthetic rubber | 43 |
| Phenolic resin | 2 |
| Pure titanium dioxide | 2 |
| | 100 |

| Nonsolid Ingredients | |
|---|---|
| Ketone | 33 |
| Aromatic | 67 |
| | 100 |

| Organosol-Solution Coating Composition | |
|---|---|
| Resin base plug pigment | 19.7 |
| Ketone | 26.0 |
| Aromatic | 54.3 |
| | 100.0 |

EXAMPLE 7

| Solid Ingredients | Percent By Weight |
|---|---|
| Polyvinyl chloride resin | 44 |
| Acrylonitrile-butadiene synthetic rubber | 36 |
| Phenolic resin | 18 |
| Pure titanium dioxide | 2 |
| | 100 |

| Nonsolid Ingredients | |
|---|---|
| Ketone | 34 |
| Aromatic | 66 |
| | 100 |

Example 7—Continued

| Organosol-Solution Coating Composition | |
|---|---|
| Resin base plus pigment | 18.3 |
| Ketone | 27.5 |
| Aromatic | 54.2 |
| | 100.0 |

EXAMPLE 8

| Solid Ingredients | Percent By Weight |
|---|---|
| Polyvinyl chloride resin | 33 |
| Acrylonitrile-butadiene synthetic rubber | 10 |
| Phenolic resin | 55 |
| Pure titanium dioxide | 2 |
| | 100 |

| Nonsolid Ingredients | |
|---|---|
| Ketone | 37 |
| Aromatic | 63 |
| | 100 |

| Organosol-Solution Coating Composition | |
|---|---|
| Resin base plus pigment | 26.2 |
| Ketone | 27.3 |
| Aromatic | 46.5 |
| | 100.0 |

EXAMPLE 9

| Solid Ingredients | Percent By Weight |
|---|---|
| Polyvinyl chloride resin | 30 |
| Acrylonitrile-butadiene synthetic rubber | 18 |
| Phenolic resin | 50 |
| Pure titanium dioxide | 2 |
| | 100 |

| Nonsolid Ingredients | |
|---|---|
| Ketone | 30 |
| Aromatic | 70 |
| | 100 |

| Organosol-Solution Coating Composition | |
|---|---|
| Resin base plus pigment | 24.3 |
| Ketone | 22.3 |
| Aromatic | 53.4 |
| | 100.0 |

EXAMPLE 10

| Solid Ingredients | Percent By Weight |
|---|---|
| Polyvinyl chloride resin | 26 |
| Acrylonitrile-butadiene synthetic rubber | 36 |
| Phenolic resin | 36 |
| Pure titanium dioxide | 2 |
| | 100 |

| Nonsolid Ingredients | |
|---|---|
| Ketone | 39 |
| Aromatic | 61 |
| | 100 |

| Organosol-Solution Coating Composition | |
|---|---|
| Resin base plus pigment | 20.1 |
| Ketone | 31.5 |
| Aromatic | 48.4 |
| | 100.0 |

EXAMPLE 11

| Solid Ingredients | Percent By Weight |
|---|---|
| Polyvinyl chloride resin | 25 |
| Acrylonitrile-butadiene synthetic rubber | 29 |
| Phenolic resin | 44 |
| Pure titanium dioxide | 2 |
| | 100 |

| Nonsolid Ingredients | |
|---|---|
| Ketone | 37 |
| Aromatic | 63 |
| | 100 |

| Organosol-Solution Coating Composition | |
|---|---|
| Resin base plus pigment | 21.3 |
| Ketone | 30.9 |
| Aromatic | 47.8 |
| | 100.0 |

EXAMPLE 12

| Solid Ingredients | Percent By Weight |
|---|---|
| Polyvinyl chloride resin | 58 |
| Acrylonitrile-butadiene synthetic rubber | 16 |
| Phenolic resin | 24 |
| Pure titanium dioxide | 2 |
| | 100 |

| Nonsolid Ingredients | |
|---|---|
| Ketone | 27 |
| Aromatic | 73 |
| | 100 |

| Organosol-Solution Coating Composition | |
|---|---|
| Resin base plus pigment | 21 |
| Ketone | 22 |
| Aromatic | 57 |
| | 100 |

It has been found that the procedure by which the various ingredients of the coating compositions are added to one another is important in obtaining the desired end results. This procedure constitutes an important part of the present invention. In carrying out the method of preparation, the three different resins are first prepared as separate solutions or dispersions following which they are combined in a preferred sequence as will be described.

The resins used in forming organosol dispersions are polymers of vinyl chloride or copolymers in which vinyl chloride is the predominant constituent. These resins are prepared by emulsion polymerization to attain the small particle size and spherical shape most desirable for good flow properties. The commercial resins range in particle size from 0.02 to 2 microns in diameter.

As is well known in the art, the liquid phase of an organosol must be selected with care. It must exhibit an adequate dispersing action on the polyvinyl chloride resin particles while being unable to dissolve the particles at room temperature. The liquid phase is prepared by proper blending of polar liquids (dispersants) with nonpolar liquids (diluents) until the proper organosol consistency is obtained. Sufficient dispersant should be present to deflocculate the small resin particles but an excess should be avoided since the viscosity will increase as a result of excessive solvent action and swelling of the polyvinyl chloride particles. Preferably, the dispersants used with polyvinyl chloride are ketones or esters while the diluents are aromatic or aliphatic hydrocarbons. There are a number of well-known dispersants and diluents capable of accomplishing the desired results and these dispersants and diluents are selected depending largely on the method by which the coating composition is to be applied to the metal surface. Certain dispersants and diluents will preferably be used for roller-coating application while others will be more suitable for application by spraying, dipping, brushing, etc. Dispersant-diluent ratios will vary depending upon the viscosity characteristics desired in the final product as well as being dependent to an extent on the evaporation time. Variation of such ratios is commonly practiced in the art in connection with the preparation and application of known coating compositions.

In formulating the coating composition of the present invention, high molecular weight polyvinyl chloride resin is partially dispersed in an aromatic diluent to form an organosol dispersion having about 50 percent solids concentration. The acrylonitrile-butadiene synthetic rubber is solvated in the presence of aromatic diluent and a ketone (which functions as a suitable solvent with all but polyvinyl chloride) to form a solution having about 15 percent solids concentration. By way of example, 67 percent aromatic diluent and 33 percent ketone solvent may be used.

The phenolic resin is prepared in the form of a solution having about 40 percent solids concentration preferably in 75 percent ketone solvent and 25 percent aromatic diluent. The phenol resins suitable for use are known as the baking-type resole resins formed as condensation products of phenol-formaldehyde containing mixtures. Such resins are readily soluble and are known for their ability in forming baked-out films for coating purposes.

The pigment dispersion is prepared on the basis of about 50 percent solids concentration with 25 percent titanium dioxide and 25 percent polyvinyl chloride in a dispersant system of 67 percent aromatic diluent and 33 percent ketone dispersant.

The separate mixtures are then ready for combination to form the coating composition. The pigment dispersion is added to the basic organosol polyvinyl chloride dispersion while the latter is under agitation. The acrylonitrile-butadiene copolymer solution is next added to the combined ingredients while maintaining the same under agitation. At this point in the formulation of the coating composition, additional dispersant and diluent are preferably added to complete polyvinyl chloride dispersion. The final addition, and the most important with respect to the order of combination of ingredients, is the addition of the phenolic resin solution to the prepared mixture while maintaining the latter under agitation. Adequate phenolic solution is added to the overall mixture to obtain the final desired weight ratio of solid ingredients of the composition. In connection with the formulation set forth above in example 5, the ingredients are preferably combined to provide a finished formulation having 28 percent solids concentration in 67 percent aromatic diluent and 33 percent ketone dispersant-solvent.

With respect to the order of addition of the various ingredients, it has been found that the addition of the phenolic resin solution is extremely important. The acrylonitrile-butadiene copolymer solution must be added prior to the phenolic resin solution to prevent the phenolic resin from precipitating out of the system. Still further, it has bee found preferable to formulate the composition at room temperature or above to prevent the phenolic resin from precipitating out of solution. With the polyvinyl chloride resin being considered as the basic resin in the system, the acrylonitrile-butadiene and phenolic resins in the system, the acrylonitrile-butadiene and phenolic resins may be varied as shown in the examples as long as these resins are added in sufficient quantities to function in the manner described.

In preparing the formulation listed in example 5 above for application by roller coating, the following specific resin compositions are prepared and combined in conformance with the general procedure set forth above.

Polyvinyl Chloride Partial Dispersion

| | |
|---|---|
| Polyvinyl Chloride | 56 lbs. |
| Aromatic Diluent | 56 lbs. |
| | 112 lbs. |

Acrylonitrile-Butadiene Copolymer Solution

| | |
|---|---|
| Acrylonitrile-Butadiene | 16.5 lbs. |
| Ketone Solvent | 30.9 lbs. |
| Aromatic Diluent | 62.6 lbs. |
| | 110.0 lbs. |

Phenolic Solution

| | |
|---|---|
| Phenolic Resin | 23.5 lbs. |
| Ketone Solvent | 26.4 lbs. |
| Aromatic Diluent | 8.8 lbs. |
| | 58.7 lbs. |

Pigment and Polyvinyl Chloride Dispersion

| | |
|---|---|
| Titanox RA | 2.00 lbs. |
| Polyvinyl Chloride | 2.00 lbs. |
| Aromatic Diluent | 2.68 lbs. |
| Ketone Dispersant | 1.32 lbs. |
| | 8.00 lbs. |

Additional Dispersant and Diluent

| | |
|---|---|
| Aromatic Diluent | 41.92 lbs. |
| Ketone Dispersant | 26.38 lbs. |
| | 68.30 lbs. |

The polyvinyl chloride resin used is a long-chain high molecular weight, dispersion grade resin such as "Geon 121," "QYNV," "Opalon 410," or "Exon 654. The polyvinyl chloride resin will have a mean molecular weight of around 80,000. The acrylonitrile-butadiene synthetic rubber is commonly referred to as "Buna N" and is commercially available as "Hycar 1432" and "Chemigum N3NS." The phenolic resins may be any suitable baking-type resole as described above. In the specific examples, the phenolic resin used has the following reaction mixture formulation:

| | | |
|---|---|---|
| Phenol | 80 | parts |
| Ortho-Cresol | 20 | parts |
| Formaldehyde | 66.6 | parts |
| Hexamethylene Tetramine | 2.4 | parts |

| | | |
|---|---|---|
| Phenol | 80 | parts |
| Ortho-Cresol | 20 | parts |
| Formaldehyde | 66.6 | parts |
| Hexamethylene Tetramine | 2.4 | parts |

This particular mixture upon condensation reaction in the well-known manner provides a one-step baking-type resole which exhibits adequate solubility for the purposes of the present invention.

Any suitable pigment may be included in the formulation with the titanium dioxide referred to above being merely illustrative. It will further be understood that a pigment is not essential to the formulation.

A suitable ketone is "Isophorone" which is a ring compound (3,5, 5-trimethylcyclohexene-2-one-1). Other suitable ketones are di-isobutyl, methyl isobutyl and ethyl butyl which are more volatile ketones providing a faster rate of evaporation which is of importance in connection with the method of application of the coating composition to the metal surface. Examples of suitable esters are butyl acetate, ethyl acetate and "Cellosolve" acetate which is ethylene glycol-monoethyl ether acetate.

Examples of aromatics are the commercially available mixtures of high-boiling aromatics such as "Comsolv" 0100 and 0150 the 0100 having a flash point of about 100° F. and the 0150 having a flash point of about 150° F. These diluents are straight cut aromatic mixtures. For application of the liner by methods other than roller coating, suitable aromatics are toluene, xylene and high-flash coal tar naphtha such as that having a flash point of 107° F. The "Solvesso" solvents 0100 and 0150 referred to above in the specific formulation are hydrogenated Naphthas. In the preferred roller-coating formulation set forth above in example 5, the aromatic diluent used is a mixture of 0100 and 0150 of "Comsolv" or "Solvesso." In preparing the composition for application by spraying, it is necessary to merely substitute low boiler aromatics which are readily available. In formulating for application by dipping, the aromatics will preferably be combinations of medium and low boilers with 0100 "Comsolv" or "Solvesso" being examples of medium boilers.

Suitable aliphatics are mineral spirits of varying flash points such as a mixture having a flash point of 105° F. Aliphatics of this type are well known and it will be understood that admixtures of aromatic and aliphatic solvents may be used.

It has been found that amounts of the various resin polymer components may be varied considerably relative to one another and preferably the resin base of the composition is formulated within the broad ranges of 25 percent to 73 percent polyvinyl chloride, 10 percent to 43 percent acrylonitrile-butadiene and 2 percent to 55 percent phenolic. For roller coating the preferred ranges are 44 percent to 65 percent polyvinyl chloride, 16 percent to 36 percent acrylonitrile-butadiene, and 13 percent to 23 percent phenolic. In coating closure caps of standard type with which plastisol gasketing material is used, the above-identified formulations may be applied at film weights to 2.5 mgs./sq. in. and cured or baked at 340° to 360° F. for about 10 minutes.

By way of example, the following plastisol formulation exemplifies a suitable composition from which a gasket is formed which is readily adherent to the coating composition of the present invention.

| Ingredients | Parts by Weight |
| --- | --- |
| Geon 121 | 55 |
| Geon 202 | 45 |
| Citroflex A-4 | 50 |
| Paraplex G-62 | 10 |
| Ferro 707X | 1 |
| Barytes (01 white) | 50 |
| Titanox RA | 1 |
| | 212 |

| Ingredients | Parts by Weight |
| --- | --- |
| Geon 121 | 55 |
| Geon 202 | 45 |
| Citroflex A-4 | 50 |
| Paraplex G-62 | 10 |
| Ferro 707X | 1 |
| Barytes (01 white) | 50 |
| Titanox RA | 1 |
| | 212 |

The "Geon 121" is the same dispersion grade polyvinyl chloride resin described above. "Geon 202" is a copolymer-modifying resin of larger particle size containing approximately 94 percent vinyl chloride and 6 percent vinylidene chloride. "Citroflex A-4" is an acetyltributyl citrate plasticizer. "Paraplex G-62" is a polyester epoxide plasticizer. "Ferro 707X" is a stabilizer soap. While this particular stabilizer is preferred, calcium ricinoleate may be used. "Titanox RA" is a titanium dioxide pigment.

While the coating compositions of the present invention have been described in connection with their advantageous use with plastisol-type gasketing material, it will be understood that the coating compositions are entirely suitable for any standard use. As described, the unique bonding characteristics with plastisols particularly adapts the compositions for use with the same and provides a commercially acceptable solution to a difficult problem. While only one specific example of a suitable plastisol gasket formulation has been set forth, it will be understood that there are a number of known plastisol materials of varying formulation. Such materials as described earlier basically include polyvinyl chloride which may be in copolymeric form such as polyvinyl chloride—polyvinylidene chloride copolymers and polyvinyl chloride—polyvinyl acetate copolymers.

Obviously certain modifications and variations of the invention as hereinbefore set forth may be made without departing from the spirit and scope thereof, and therefore only such limitations should be imposed as are indicated in the appended claims.

We claim:

1. A three-component resin coating composition for coating closure members comprising polyvinyl chloride resin, solvated acrylonitrile-butadiene copolymer, a solvated phenolic resole resin, and solvents for said acrylonitrile-butadiene copolymer and phenolic resole resin said polyvinyl chloride resin being dispersed with the solvated components to form a combination organosol-solution.

2. A three-component resin coating composition for coating closure members comprising polyvinyl chloride resin, solvated acrylonitrile-butadiene copolymer, a solvated phenolic resole resin, and solvents for said acrylonitrile-butadiene copolymer and phenolic resole resin, said polyvinyl chloride resin being dispersed with the solvated components to form a combination organosol-solution, the resin base being formulated within the ranges of about 25 percent to 73 percent polyvinyl chloride, about 10 percent to 43 percent acrylonitrile-butadiene copolymer, and about 2 percent to 55 percent phenolic resole resin by weight.

3. A three-component resin coating composition for coating closure members comprising polyvinyl chloride resin, solvated acrylonitrile-butadiene copolymer; a solvated phenolic resole resin, and solvents for said acrylonitrile-butadiene copolymer and phenolic resole resin, said polyvinyl chloride resin being dispersed with the solvated components to form a combination organosol-solution, the resin base being formulated within the ranges of about 44 percent to 65 percent polyvinyl chloride, about 16 percent to 36 percent acrylonitrile-butadiene copolymer, and about 13 percent to 23 percent phenolic resole resin by weight.

4. A three-component resin coating composition for coating closure members comprising polyvinyl chloride resin, solvated acrylonitrile-butadiene copolymer, solvated phenolic resole resin, and solvents for said acrylonitrile-butadiene copolymer and phenolic resole resin, said polyvinyl chloride resin being dispersed with the solvated components to form a combination organosol-solution, the resin base comprising about 58 percent polyvinyl chloride, about 16.5 percent acrylonitrile-butadiene copolymer, and about 23.5 percent phenolic resole by weight.

5. A cured coating composition comprising the reaction product of an organosol-solution consisting essentially of polyvinyl chloride, acrylonitrile-butadiene copolymer, and a phenolic resole resin.

6. A cured coating composition comprising the reaction product of an organosol-solution consisting essentially of about 58 percent polyvinyl chloride, about 16.5 percent acrylonitrile-butadiene copolymer, and about 23.5 percent phenolic resole resin by weight.

7. A three-component resin coating composition for coating closure members comprising polyvinyl chloride resin, a dispersant therefor, solvated acrylonitrile-butadiene copolymer, a solvated phenolic resole resin, and solvents for said acrylonitrile-butadiene copolymer and phenolic resole resin, said polyvinyl chloride resin being dispersed with the solvated components to form a combination organosol-solution, the resin base being formulated within the ranges of about 25 to 73 percent polyvinyl chloride, about 10 to 43 percent acrylonitrile-butadiene copolymer, and about 2 to 55 percent phenolic resole resin by weight, the dispersants and solvents used in formulating said composition being taken from the group consisting of ketones, esters, aromatic and aliphatic hydrocarbons and mixtures thereof.

8. A three-component resin coating composition for coating closure members comprising polyvinyl chloride resin, a dispersant therefor solvated acrylonitrile-butadiene copolymer, solvated phenolic resole resin, and solvents for said acrylonitrile-butadiene copolymer and phenolic resole resin, said polyvinyl chloride resin being dispersed with the solvated components to form a combination organosol-solution, the resin base being formulated within the ranges of about 44 to 65 percent polyvinyl chloride, about 16 to 36 percent acrylonitrile-butadiene copolymer, and about 13 to 23 percent phenolic resole resin by weight, the dispersants and solvents used in formulating said composition being taken from the group consisting of ketones, esters, aromatic and aliphatic hydrocarbons and mixtures thereof.

9. The method of formulating a three-component resin coating composition for coating closure members said method comprising separately forming a dispersion of polyinyl chloride resin, a solution of acrylonitrile-butadiene copolymer and a solution of phenolic resole resin, and combining under agitation the dispersion and solutions formed by first combining the acrylonitrile-butadiene copolymer solution with the polyvinyl chloride dispersion followed by addition of the phenolic resole resin solution.

10. The method of claim 9 wherein the quantities of resins used to define the resin base fall within the ranges of about 25 to 73 percent polyvinyl chloride, about 10 to 43 percent acrylonitrile-butadiene copolymer and about 2 to 55 percent phenolic resole by weight.

11. The method of claim 9 wherein the quantities of resins used to define the resin base fall within the ranges of about 44 to 65 percent polyvinyl chloride, about 16 to 36 percent acrylonitrile-butadiene copolymer, and about 13 to 23 percent phenolic resole by weight.

12. The method of formulating a three-component resin coating composition for coating closure members, said method comprising separately forming a dispersion of polyvinyl chloride resin, a pigment-bearing dispersion including polyvinyl chloride resin, a solution of acrylonitrile-butadiene copolymer, and a solution of phenolic resole resin, and combining under agitation the dispersions and solutions formed by first combining the pigment and polyvinyl chloride resin dispersions, adding the acrylonitrile-butadiene copolymer solution thereto followed by addition of the phenolic resole resin solution.

13. The method of claim 12 wherein the polyvinyl chloride dispersion contains about 50 percent solids concentration, the pigment-bearing dispersion contains about 50 percent solids concentration based on the presence of about half pigment and half polyvinyl chloride, the acrylonitrile-butadiene copolymer solution contains about 15 percent solids concentration, and the phenolic resole resin solution contains about 40 percent solids concentration, the combined weight ratio of said resin base being about 58 percent polyvinyl chloride, about 16.5 percent acrylonitrile-butadiene copolymer and about 23.5 percent acrylonitrile-butadiene copolymer and about 23.5 percent phenolic resole resin with about 2 percent pigment.

14. The method of claim 12 wherein the polyvinyl chloride dispersion contains about 50 percent solids concentration in an aromatic hydrocarbon diluent, the pigment-bearing dispersion contains about 50 percent solids concentration based on the presence of about half pigment and half polyvinyl chloride in a mixture of about 67 percent aromatic hydrocarbon diluent and 33 percent ketone dispersant, the acrylonitrile-butadiene copolymer solution contains about 15 percent solids concentration in a mixture of about 67 percent aromatic hydrocarbon diluent and 33 percent ketone solvent, and the phenolic resole resin solution contains about 40 percent solids concentration in a mixture of about 25 percent aromatic hydrocarbon diluent and 75 percent ketone solvent, the combined weight ratio of said resin base being about 58 percent polyvinyl chloride, about 16.5 percent acrylonitrile-butadiene copolymer, and about 23.5 percent phenolic resole resin with about 2 percent pigment.

15. In a closure member formed from metallic material and being provided with a top panel and depending skirt portion, the improvement comprising the inner surface of said top panel having applied thereto a cured three-component resin coating composition comprising polyvinyl chloride resin, acrylonitrile-butadiene copolymer, and phenolic resole resin, said components having been dispersed and solvated to form a combination organosol-solution prior to curing, and a cured plasticized polyvinyl chloride gasket adhered to said coating.

16. The closure member of claim 15 wherein the resin base of said composition is formulated within the ranges of about 25 to 73 percent polyvinyl chloride, about 10 to 43 percent acrylonitrile-butadiene copolymer, and about 2 to 55 percent phenolic resole resin by weight.

17. The closure member of claim 15 wherein the resin base of said composition is formulated within the ranges of about 44 to 65 percent polyvinyl chloride, about 16 to 36 percent acrylonitrile-butadiene copolymer, and about 13 to 23 percent phenolic resole resin by weight.

UNITED STATES PATENT OFFICE
CERTIFICATE OF CORRECTION

Patent No. 3,613,613          Dated October 19, 1971

Inventor(s) Edward F. Loritz and Harold W. Unger

It is certified that error appears in the above-identified patent and that said Letters Patent are hereby corrected as shown below:

Column 9, line 63, "bee" should be --been--.

Column 9, line 68, delete the entire line.

Column 10, between lines 56 and 68, delete one of the duplicate tables.

Column 11, line 11, "0100" should be --#100--.

Column 11, line 12, "0150" should be --#150--.

Column 11, line 12, "0100" should be --#100--.

Column 11, line 13, "0150" should be --#150--.

Column 11, line 17, "0100" should be --#100--.

Column 11, line 18, "0150" should be --#150--.

Column 11, line 19, "Naphthas" should be --naphthas--.

Column 11, line 21, "0100" should be --#100--.

Column 11, line 21, "0150" should be --#150--.

Column 11, line 26, "0100" should be --#100--.

Column 11, line 39, delete one of the numbers "36" before the word "percent" in the second occurence.

Column 11, between lines 50 and 76, delete one of the duplicate tables.

Column 14, line 19, delete the entire line.

Signed and sealed this 2nd day of May 1972.

(SEAL)
Attest:

EDWARD M. FLETCHER, JR.
Attesting Officer

ROBERT GOTTSCHALK
Commissioner of Patents